United States Patent [19]

Ohkawa et al.

[11] 4,018,756
[45] Apr. 19, 1977

[54] THIAZOLE AND BENZOTHIAZOLE CATIONIC DYES

[75] Inventors: Masaaki Ohkawa, Takatsuki; Yoshio Tanaka, Osaka; Yoshiro Takeda, Takarazuka; Tadao Kinoshita, Nishinomiya; Kazuyoshi Hirabayashi, Takarazuka, all of Japan

[73] Assignee: Sumitomo Chemical Company, Limited, Osaka, Japan

[22] Filed: June 14, 1971

[21] Appl. No.: 153,080

[30] Foreign Application Priority Data

June 12, 1970 Japan .............................. 45-51301
June 12, 1970 Japan .............................. 45-51302
Sept. 10, 1970 Japan .............................. 45-79751

[52] U.S. Cl. .......................... 260/146 R; 260/158; 260/319.1; 260/326.5 R
[51] Int. Cl.² .................. C09B 29/08; C09B 29/36; D06P 1/08; D06P 3/70
[58] Field of Search ........................ 260/158, 146 R

[56] References Cited

UNITED STATES PATENTS

| 3,136,751 | 6/1964 | Iizuka et al. ......................... 260/158 |
| 3,221,006 | 11/1965 | Moore et al. ......................... 260/158 |
| 3,634,389 | 1/1972 | Entschel et al. .................... 260/158 |

*Primary Examiner*—Floyd D. Higel
*Attorney, Agent, or Firm*—Sughrue, Rothwell, Mion, Zinn & Macpeak

[57] ABSTRACT

A cationic dye compound of the formula

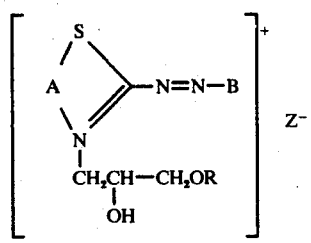

wherein the group

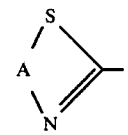

represents an unsubstituted or 4 and/or 5-substituted thiazole ring, or an unsubstituted or 6-substituted benzothiazole ring, B represents an indolyl group represented by the formula

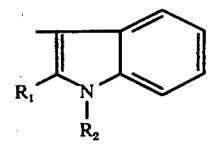

wherein $R_1$ represents an alkyl having 1 to 4 carbon atoms, an aralkyl or an aryl, said aryl may have an alkyl having 1 to 2 carbon atoms, an alkoxy having 1 to 2 carbon atoms, a halogen, cyano or nitro, and $R_2$ represents hydrogen, an alkyl having 1 to 4 carbon atoms, an alkoxyalkyl, an acyloxyalkyl, a haloalkyl, a cyanoalkyl or a carbamoylalkyl, or an anilino group represented by the formula

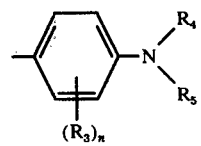

wherein $R_3$ represents hydrogen, an alkyl having 1 to 2 carbon atoms, an alkoxy having 1 to 2 carbon atoms, a halogen, cyano or nitro, $R_4$ and $R_5$ represent individually an alkyl having 1 to 4 carbon atoms, an alkoxyalkyl, an acyloxyalkyl, a cycloalkyl, an aralkyl or an aryl, said aryl may have an alkyl having 1 to 2 carbon atoms, an alkoxy having 1 to 2 carbon atoms, a halogen, cyano or nitro, and $n$ is an integer of 1 or 2, R represents an alkyl having 1 to 4 carbon atoms and $Z^-$ is an anion, which is useful as a red or blue cationic dye for dyeing fibrous materials composed of an acid modified polyacrylonitrile, its copolymer, polyamide or polyester.

13 Claims, No Drawings

THIAZOLE AND BENZOTHIAZOLE CATIONIC DYES

BACKGROUND OF THE INVENTION

1. Field of the Invention

The present invention relates to a novel cationic dye represented by the Formula I, which may be useful for dyeing synthetic fibrous materials composed of an acid modified polyacrylonitrile or a copolymer thereof, polyamide or polyester:

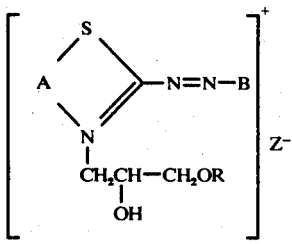
(I)

wherein the group

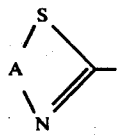

represents an unsubstituted or 4 and/or 5-substituted thiazole ring, or an unsubstituted or 6-substituted benzothiazole ring, B represents an indolyl group represented by the formula

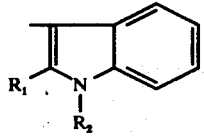

wherein $R_1$ represents an alkyl having 1 to 4 carbon atoms, an aralkyl or an aryl, said aryl may have an alkyl having 1 to 2 carbon atoms, an alkoxy having 1 to 2 carbon atoms, a halogen, cyano or nitro, and $R_2$ represents hydrogen, an alkyl having 1 to 4 carbon atoms, an alkoxyalkyl, an acyloxyalkyl, a haloalkyl, a cyanoalkyl or a carbamoylalkyl, or an anilino group represented by the formula

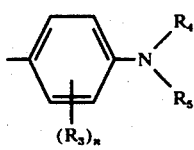

wherein $R_3$ represents hydrogen, an alkyl having 1 to 2 carbon atoms, an alkoxy having 1 to 2 carbon atoms, a halogen, cyano or nitro, $R_4$ and $R_5$ represent individually an alkyl having 1 yo 4 carbon atoms, an alkoxyalkyl, an acyloxyalkyl, a cycloalkyl, an aralkyl or an aryl, said aryl may have an alkyl having 1 to 2 carbon atoms, an alkoxy having 1 to 2 carbon atoms, a halogen, cyano or nitro, and $n$ is an integer of 1 or 2, R represents an alkyl having 1 to 4 carbon atoms, and $Z^-$ is an anion.

More particularly, the present invention relates to blue cationic dyes represented by the formula

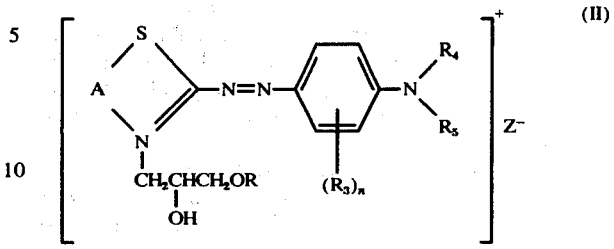
(II)

and red cationic dyes represented by the formula

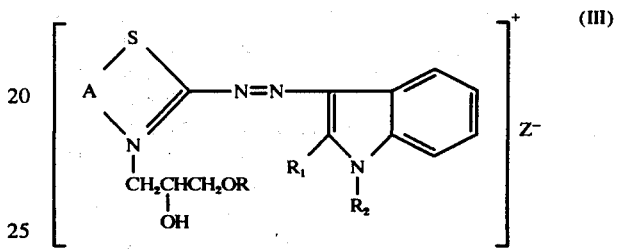
(III)

wherein R, $R_1$, $R_2$, $R_3$, $R_4$, $R_5$ and

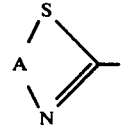

have the same significances as defined above.

2. Description of the Prior Art

Some of p-aminophenol thiazoliumazo type blue cationic dyes similar to the dyes having above formula (II) are disclosed in Japanese Patent Publications Nos. 14,337/61, 14,934/62, and 14,935/62, and it is disclosed that they have excellent color values for polyacrylonitrile fibers and the fibers dyed have excellent fastness to sunlight and cleaning. However, these known dyes have the fault that when a concentrated solution of the dye is allowed to stand at room temperature, the dye is crystallized, and further, when the dye solution is used for printing, specks are apt to form owing to the poor solubility of the dye.

Moreover, these known dyes have generally such faults that they are so poor in heat resistance, particularly steam heat resistance, that they are apt to be discolored by heat treatment. For improving these faults, the dyes as described in Japanese Patent Publication No. 5659/68 are proposed. However, if the heat resistance of dyes is improved, the solubility of the dye is greatly reduced in general, and the affinity thereof becomes too strong, whereby the dyeing velocity becomes so high that a uniform dyeing cannot be given.

The novel dyes of this invention represented by the above formula (II) have been discovered as the result of the inventor's investigation for overcoming the faults mentioned above. That is, the present dyes are excellent in solubility at low temperature as well as in fastness to steam, and also can provide uniformly dyed articles because they have a quite proper dyeing velocity in practice. Furthermore, the articles dyed by the present dyes have excellent fastness to sunlight and cleaning.

Some of the thiazole type red cationic dyes similar to the red cationic dyes represented by the above formula (III) are disclosed in Japanese Patent Publication No. 6933/59. These known dyes, however, have such faults that the affinity to fibers is too strong, whereby the dyeing velocity becomes so high that a uniform dyeing cannot be given.

The present inventors have investigated overcoming these faults and as a result have found that the dyes of the formula (III) have a quite proper dyeing velocity to give a uniform dyeing, and have less phototropy compared with the known dyes having the formula similar to that of the present dyes (III).

Thus, the present dyes of the formula (I) have so proper a dyeing velocity that they may be useful for dyeing fibrous materials to middle and light colors and are particularly useful as so-called three-primary color dyes. Moreover, the present dyes of the formula (I) are stable in hot water and in wet and dry heating on fibrous materials. Furthermore, as they have excellent water solubility, a concentrated aqueous solution thereof can be readily prepared, without precipitation, and therefore the dyes are suitable for printing.

DETAILED DESCRIPTION OF THE INVENTION

The cationic dye represented by the formula (I) may be prepared by reacting a monoazo compound represented by the general formula

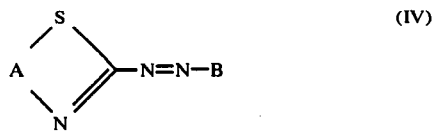

(IV)

wherein the group

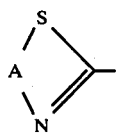

and B are as defined above, with an epoxy compound represented by the formula

(V)

wherein R is as defined above, in the presence of an organic or inorganic Broensted acid using or not using a solvent.

The monoazo compound represented by the formula (IV) may be obtained by coupling a diazotization product of a corresponding 2-aminothiazole or 2-aminobenzothiazole derivative with a corresponding indole or aniline derivative. As the 6-position substituent at the benzene ring of the 2-aminobenzothiazole, there are an alkyl group having 1 to 3 carbon atoms, an alkoxyl group, an aryloxyl group, a halogen atom, nitro group, cyano group, thiocyano group, sulfamoyl group, and an alkysulfonyl group, particularly such alkyl groups as methyl group, ethyl group and isopropyl group and such alkoxy groups as methoxy group and ethoxy group are suitable.

When the group

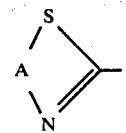

represents thiazole ring, A means an alkene, such as an ethene group, a propene group, a butene group, a cyclohexene group, a halogen alkene group, a cyanoalkene group, a phenylalkene group, and an acylalkene group.

Examples of the substituent represented by $R_1$ are methyl group, ethyl group, butyl group, a phenyl group, p-tolyl group, m-tolyl group, p-anisyl group, and p-chlorophenyl group.

As the substituent represented by $R_2$, there are illustrated a methyl group, ethyl group, hydroxyethyl group, butyl group, cyanoethyl group, carbamoylethyl group, and methoxyethyl group.

As the substituents $R_4$ and $R_5$ of the aniline derivative, there are illustrated a cyanoethyl group, an alkoxyethyl group, and an acetoxy ethyl group, a cyclohexyl group, benzyl and phenethyl group, and phenyl or a substituted phenyl besides an alkyl group having 1–4 carbon atoms.

The substituent on the phenyl groups includes an alkyl group having 1–2 carbon atoms, a lower alkoxy group, a halogen atom, cyano group, nitro group, etc. As the group $R_3$ there are illustrated an alkyl group having 1–2 carbon atoms, a lower alkoxyl group, a halogen atom, a cyano group, and a nitro group.

In carrying out the present invention, the reaction between the monazo compound (IV) and the epoxy compound (V) may be carried out in the presence of the Broensted acid.

As suitable Broensted acid used in the above reaction, there are illustrated such inorganic acids as hydrochloric acid, hydrobromic acid, sulfuric acid, and phosphoric acid, and such organic acids as benzenesulfonic acid, and toluenesulfonic acid. Also, acetic acid, propionic acid, formic acid or the like may be used as the Broensted acid as well as the solvent for the reaction.

The reaction may be carried out in the presence or absence of a solvent.

In case of using a solvent in the above reaction, the solvent is required to be inert to the epoxy compound, dissolve well the monazo compound, and have a boiling point higher than the reaction temperature. Preferable examples of such solvent are methyl cellosolve, dimethyl formamide, dioxane, tetrahydrofuran, methyl ethyl ketone, methyl isobutyl ketone, benzene, toluene, monochlorobenzene, dichlorobenzene, nitrobenzene, diacetoformamide, and methylpyrrolidone.

The above reaction may be conducted at 10°–100° C, preferably 50°–90° C, for 3 to 10 hours, ordinarily 4 to 5 hours.

The anion $Z^-$ is induced from an inorganic or organic acid, such as hydrohalogenic acid, sulfuric acid, and an organosulfonic acid. As the most general anion, there are chlorine ion, bromine ion, sulfate ion, bisulfate ion, p-toluenesulfonate ion, etc. Also, the anion of a relatively weak acid, such as formic acid, acetic acid, oxalic acid, or butyric acid is suitable. The anion also includes the anion of a complex salt of the aforesaid acid and zinc chloride.

Because the dye of this invention represented by the general formula (I) has the specific group —CH$_2$CH(OH)CH$_2$R as mentioned above, the water solubility of the dye is very excellent as compared with that of dyes having methyl group, ethyl group, cyanoethyl group, or carbamoyl ethyl group, and the dye of this invention can dye fibrous materials composed of acid-modified polyacrylonitrile polyamide and polyester, in reddish blue to greenish blue, or red from an acidic dye bath, according to the conventional dyeing method.

The present invention will now be explained in more detail by the following examples, in which all parts are by weight.

EXAMPLE 1

To a mixture of 44 parts of glycidyl methyl ether and 120 parts of glacial acetic acid was added 33.9 parts of the compound represented by the following formula:

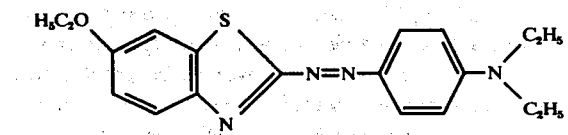

and the mixture was heated with stirring to 90°–95° C for 4 hours. After the reaction is over, the greater part of acetic acid was recovered under reduced pressure and the residue was dissolved in 1000 parts of water, and after filtering off undissolved matter, 15 parts of zinc chloride and 120 parts of sodium chloride were added to the solution to salt out the dye, which was recovered by filtration and dried. The dye thus obtained having the formula

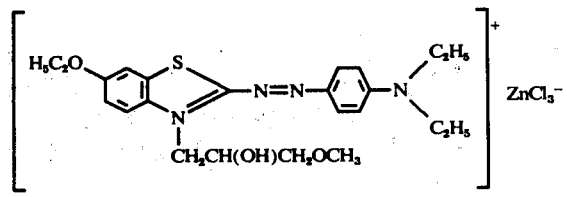

could be dissolved well in water and could dye uniformly polyacrylonitrile fibers from a weak acid bath to provide greenish blue dyed fibers having a high heat fastness.

EXAMPLE 2

To a mixture of 44 parts of glycidyl methyl ether, 100 parts of dioxane, and 10 parts of glacial acetic acid was added 39.0 parts of the compound represented by the following formula

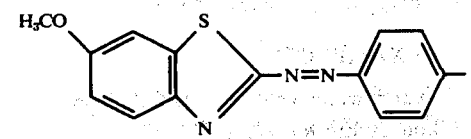

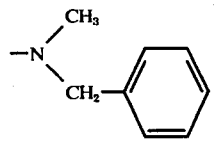

and the mixture was heated to 60°–70° C. Then, after adding dropwise 15 parts of concentrated sulfuric acid over a ten-minute period, the mixture was heated with stirring to 90° C for 4 hours.

After the reaction was over, the greater part of the dioxane was recovered under reduced pressure and the residue was dissolved in 1,000 parts of water. After filtering off the undissolved matter, 120 parts of sodium chloride were added to the solution to salt out the dye, which was recovered by filtration and dried. The dye thus obtained could be well dissolved in water and dye uniformly polyacrylonitrile fibers from a weak acid bath to provide dyed fibers in greenish blue having excellent fastness to light and heat, particularly to the heat of steam.

EXAMPLE 3

To a mixture of 44 parts of glycidyl methyl ether, 50 parts of monochlorobenzene, and 5 parts of glacial acetic was added 42.4 parts of the dye represented by the following formula:

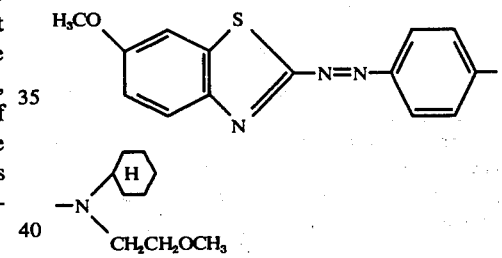

and after adding dropwise 15 parts of concentrated sulfuric acid to the solution over a period of about 10 minutes at 60°–70° C, the mixture was heated at 90° C for 4 hours. After the reaction was over, the greater part of the monochlorobenzene was recovered under a reduced pressure and the residue was dissolved in 1,000 parts of water. The undissolved matter was filtered off and then 120 parts of sodium chloride was added to the solution to salt out the dye, which was recovered by filtration and dried. The dye thus obtained could dye uniformly polyacrylonitrile fibers from a weak acid bath to provide the dyed fibers in greenish blue having excellent fastness to light and heat, particularly to the heat of steam.

EXAMPLE 4

To a mixture of 50 parts of glycidyl ethyl ether and 50 parts of formic acid was added 39.9 parts of the dye represented by the following formula:

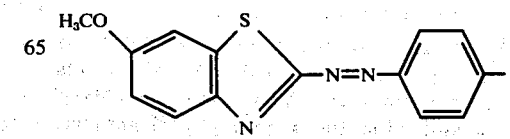

-continued

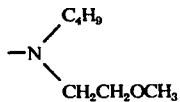

and after adding 15.0 parts of 35% hydrochloric acid to the solution, the mixture was stirred for 4 hours at 60° C. After the reaction was over, the greater part of the formic acid was recovered under a reduced pressure and the residue was dissolved in 1,000 parts of water. The undissolved matter was filtered off and then 15 parts of zinc chloride and 120 parts of sodium chloride were added to the solution to salt out the dye, which was recovered by filtration and dried. The dye thus obtained could be dissolved well in water and could dye uniformly polyacrylonitrile fibers from a weak acid bath to provide the dyed fibers in blue having excellent fastness to light and heat, particularly to the heat of steam.

EXAMPLE 5

To a mixture of 36 parts of glycidyl methyl ether and 150 parts of glacial acetic acid was dissolved 31.8 parts of the dye represented by the following formula:

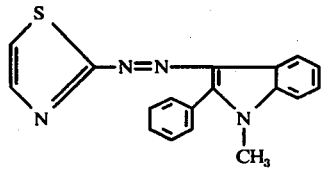

and the mixture was heated with stirring to 90°–95° C for 3 hours. After the reaction was over, the greater part of the acetic acid was recovered under a reduced pressure and the residue was dissolved in 610 parts of water. The undissolved matter was filtered off and then 90 parts of sodium chloride were added to the solution to salt out the dye, which was recovered by filtration and dried. The dye thus obtained could be dissolved well in water and dye uniformly polyacrylonitrile fibers from a weak acid bath to provide dyed fibers in yellowish red having quite excellent fastness to sunlight, cleaning and heat.

EXAMPLE 6

To a mixture of 36 parts of glycidyl methyl ether, 100 parts of methyl ethyl ketone, and 10 parts of glacial acetic acid was added 40.0 parts of the dye represented by the following formula:

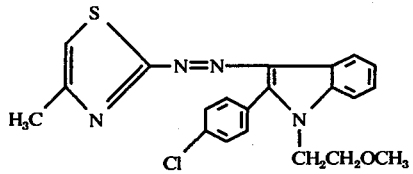

and after adding dropwise 15 parts of concentrated sulfuric acid at 60°–70° C, the mixture was stirred for 3 hours at the same temperature. After the reaction was over, the greater part of the methyl ethyl ketone was recovered and the residue was dissolved in 600 parts of water. The undissolved matter was filtered off and then 6 parts of zinc chloride and 90 parts of sodium chloride were added to the solution to salt out the dye, which was recovered by filtration and dried. The dye thus obtained could be well dissolved in water and dye uniformly polyacrylonitrile fibers from a weak acid bath to provide dyed fibers in bluish red having excellent fastness to sunlight, cleaning and heat.

EXAMPLE 7

To a mixture of 36 parts of glycidyl methyl ether and 100 parts of chlorobenzene was added 40.0 parts of the dye represented by the following formula:

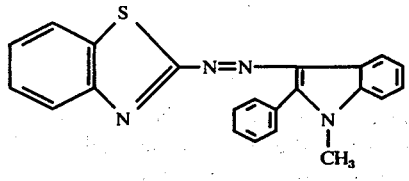

and after adding 17.2 parts of p-toluenesulfonic acid to the solution, the mixture was heated with stirring for 3 hours to 95°–100° C. After recovering the greater part of the chlorobenzene under a reduced pressure, the residue was dissolved in 600 parts of water. The undissolved matter was filtered off and 80 parts of sodium chloride were added to the solution to salt out the dye, which was recovered by filtration and dried. The dye thus obtained could be well dissolved in water and dye polyacrylonitrile fibers from a weak acid bath of the dye to provide dyed fibers in bluish red having quite excellent fastness to sunlight, cleaning, and heat.

EXAMPLE 8

In 5,000 parts of water was dissolved 1.0 part of the dye represented by the following formula:

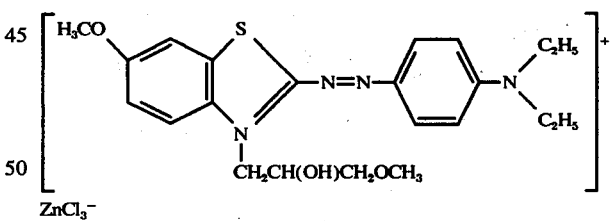

and then were added 1 part of acetic acid and 0.5 part of sodium acetate, the dye bath thus prepared was heated to 60° C, and 50 parts of Cashimilon F (trade name, made by Asahi Kasei Kogyo Co., Ltd.) was immersed in the bath. The bath was heated to boiling over 40–50 minutes and the boiling state was continued for 1 hour. By washing with water and drying, the product, dyed uniformly in blue and having excellent fastness to sunlight, heat and cleaning, was obtained.

EXAMPLE 9

In 5,000 parts of warm water was dissolved 1.0 part of the dye represented by the following formula:

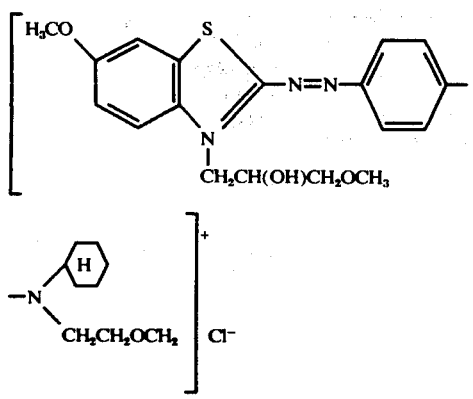

and then were added 1.0 part of acetic acid and 0.5 part of sodium acetate, and 50 parts of Vonnel V (trade name of Mitsubishi Kasei Kogyo Co., Ltd.) was immersed in the dye bath. The dye bath was then heated to boiling over 50–60 minutes and the boiling was continued for one hour. By washing with water and drying, the product, uniformly dyed in greenish blue and having excellent fastness to sunlight, heat and cleaning, was obtained.

EXAMPLE 10

In 5,000 parts of warm water was dissolved 1.0 part of the dye represented by the following formula:

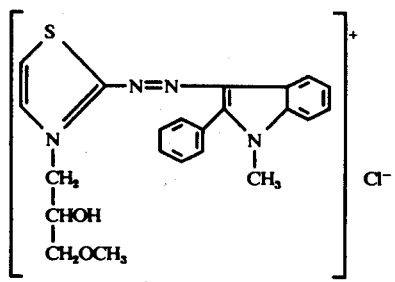

and then were added 1.0 part of acetic acid and 0.5 part of sodium acetate, 50 parts of Cashimilon F (trade name of Asahi Kasei Kogyo Co., Ltd.) was immersed in the dye bath at 60° C. The bath was heated to boiling over 40–50 minutes and the boiling was continued for 1 hour. By washing with water and drying, a product dyed clearly and uniformly in yellowish red and having excellent fastness to sunlight, cleaning and heat, was obtained.

EXAMPLE 11

In 5,000 parts of warm water was dissolved 1.0 part of the dye represented by the following formula:

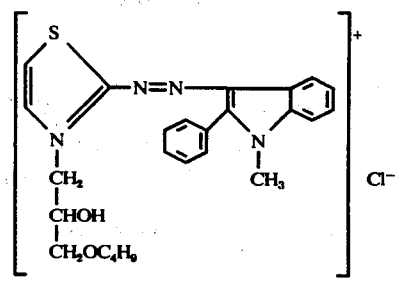

and then were added 1.0 part of acetic acid and 0.5 part of sodium acetate, and then 50 parts of Vonnel V was immersed in the dye bath at 60° C. The bath was heated to boiling over 40–50 minutes and the boiling was continued for 1 hour.

By washing with water and drying, a product dyed uniformly in bluish red and having excellent fastness to light, cleaning and heat, was obtained.

By repeating the similar procedures as in the aforementioned examples, the following valuable dyes were produced.

| Structure of Dye | Color on polyacrylonitrile fibers |
|---|---|
| 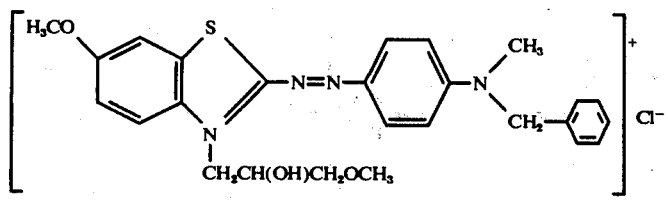 | Greenish blue |
| 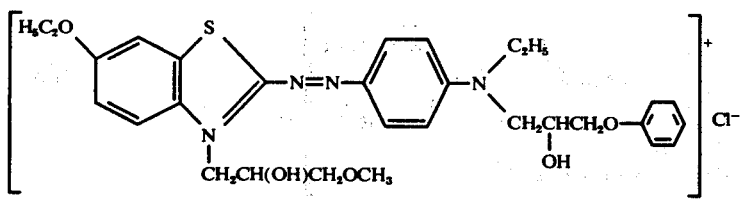 | Greenish blue |

-continued
| Structure of Dye | Color on polyacrylonitrile fibers |
|---|---|
| 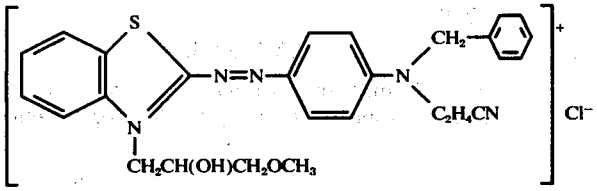 | Reddish blue |
| 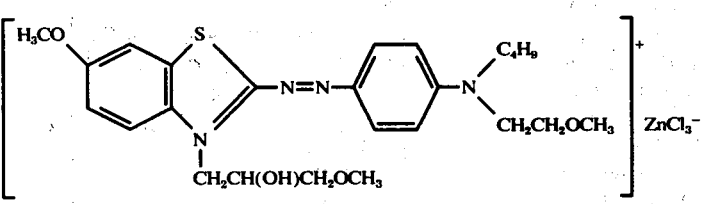 | Blue |
| 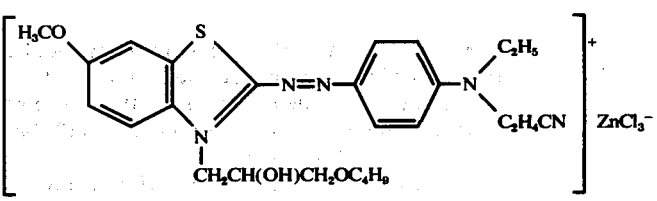 | Greenish blue |
| 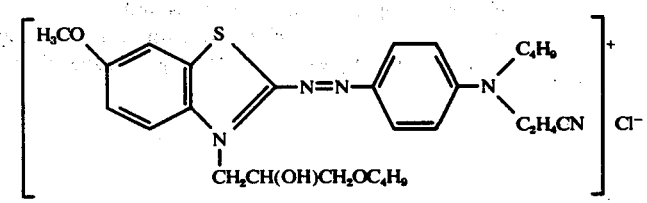 | Greenish blue |
| 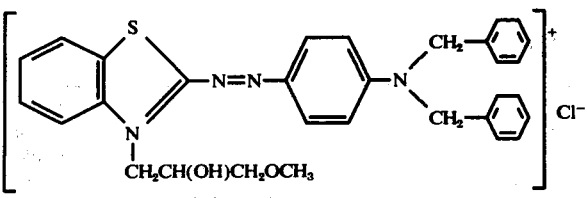 | Reddish blue |
| 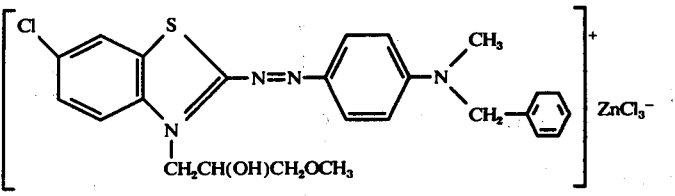 | Blue |
| 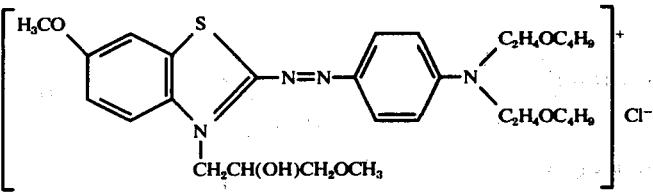 | Blue |

-continued
| Structure of Dye | Color on polyacrylo-nitrile fibers |
|---|---|
| 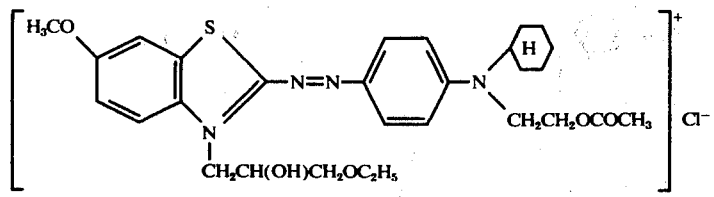 | Blue |
| 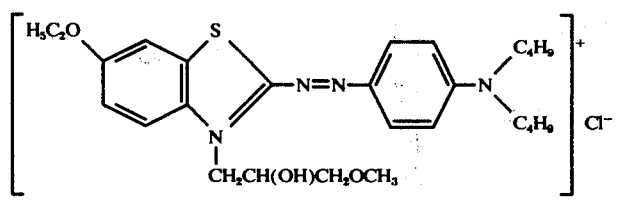 | Blue |
| 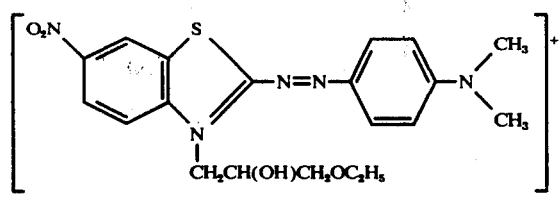 | Reddish blue |
| 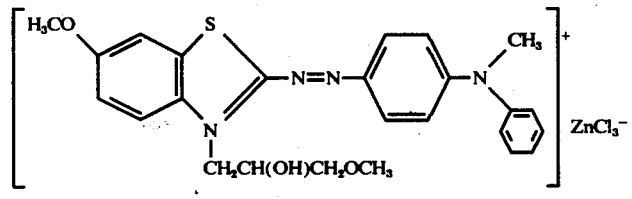 | Greenish blue |
| 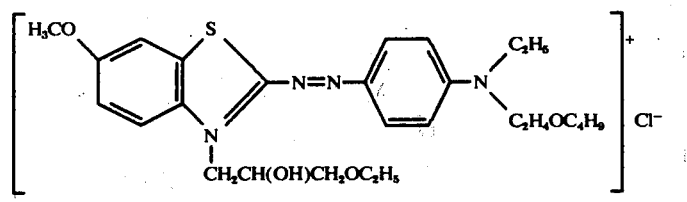 | Blue |
| 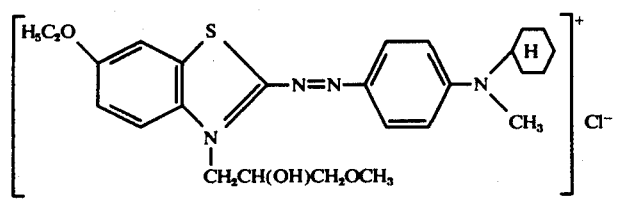 | Blue |
| 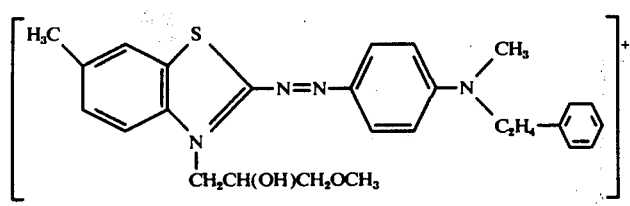 | Reddish blue |

| Structure of Dye | Color on polyacrylo-nitrile fibers |
|---|---|
| 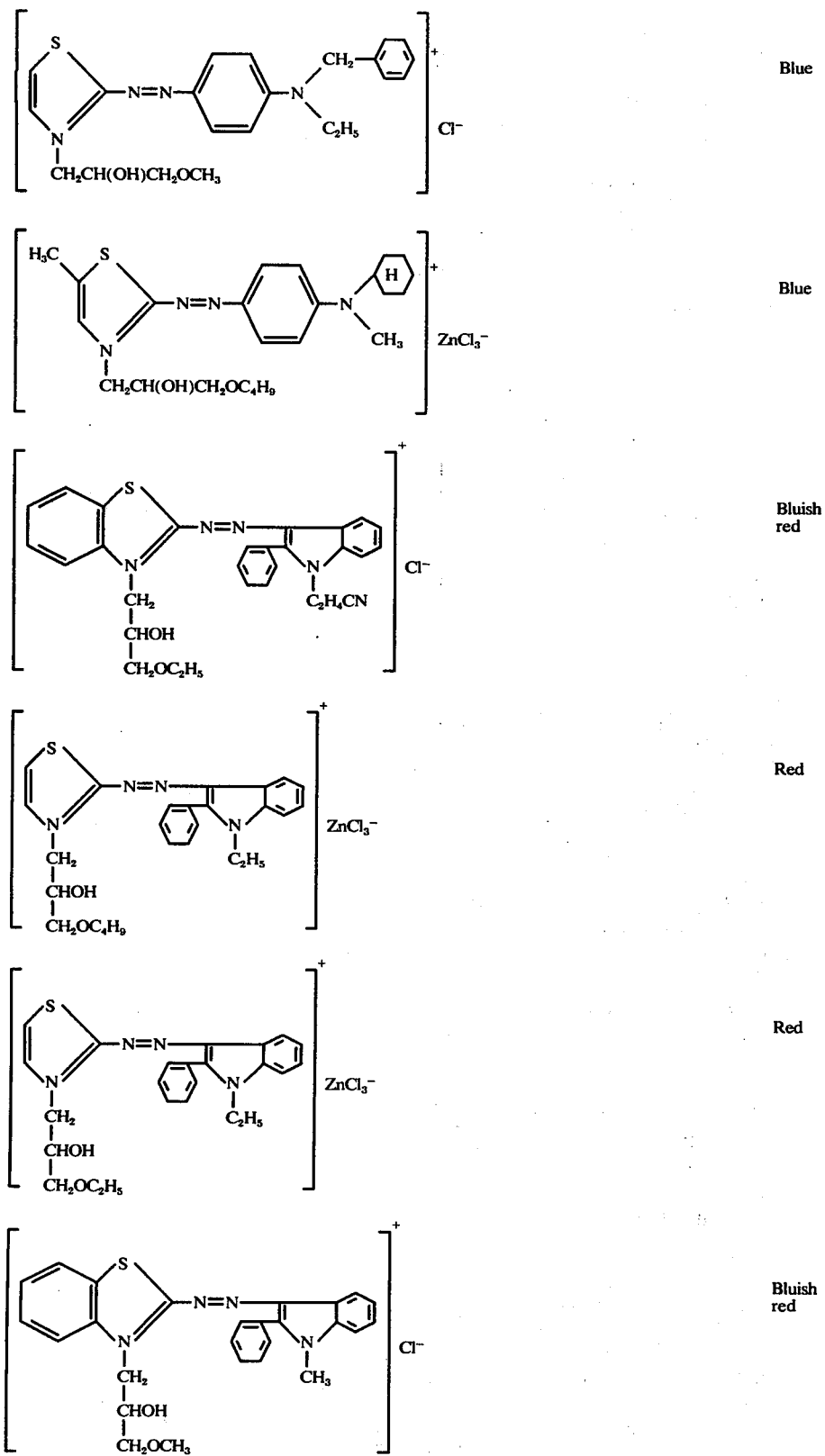 | Blue |
| | Blue |
| | Bluish red |
| | Red |
| | Red |
| | Bluish red |

-continued
| Structure of Dye | Color on polyacrylonitrile fibers |
|---|---|
| 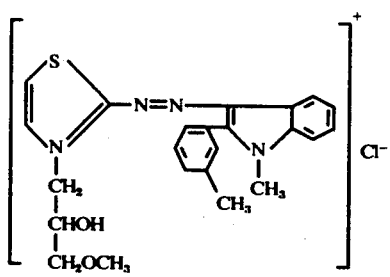 | Red |
| 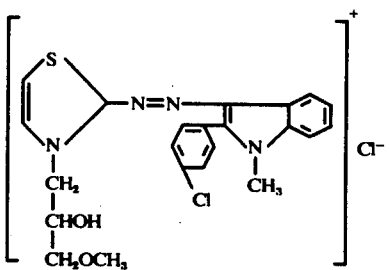 | Bluish Red |
| 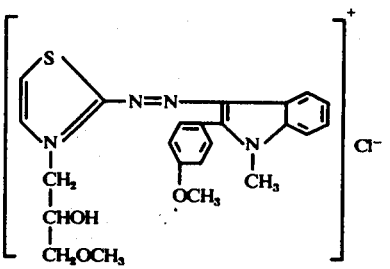 | Bluish red |
| 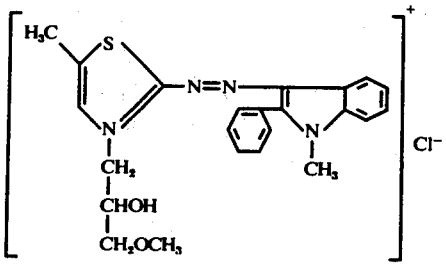 | Red |
| 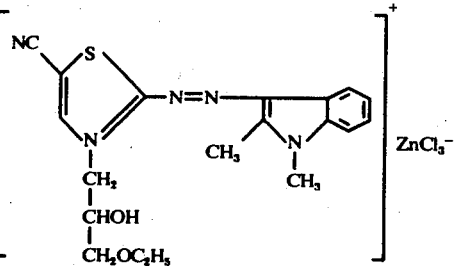 | Red |

| Structure of Dye | Color on polyacrylonitrile fibers |
|---|---|
| 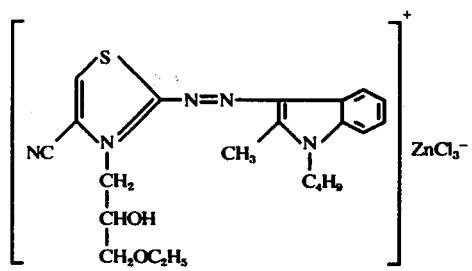 | Red |
| 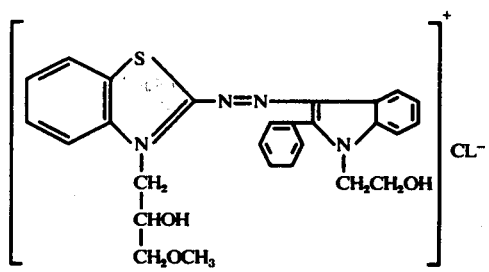 | Bluish red |
| 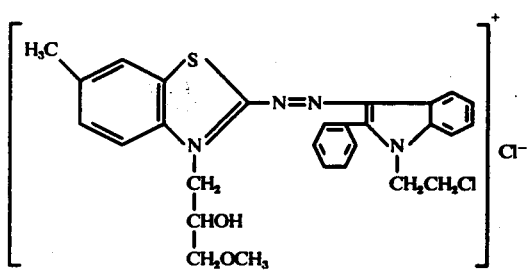 | Bluish red |
| 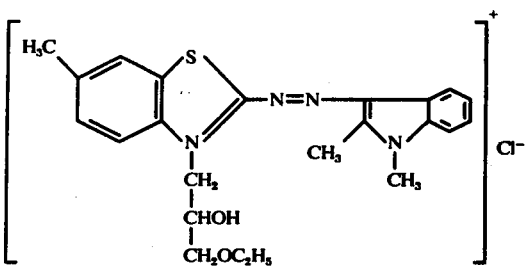 | Bluish red |
| 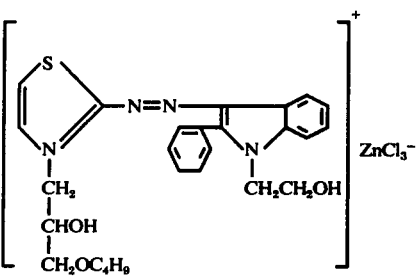 | Red |

-continued

| Structure of Dye | Color on polyacrylonitrile fibers |
|---|---|
| 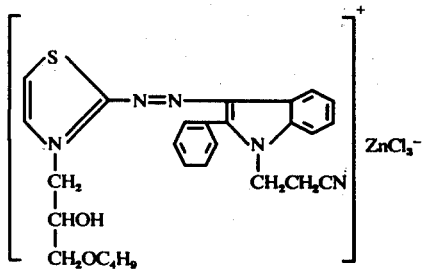 | Bluish red |
| 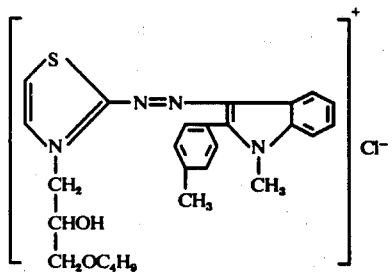 | Red |
| 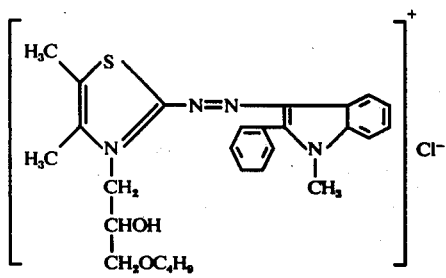 | Bluish red |
| 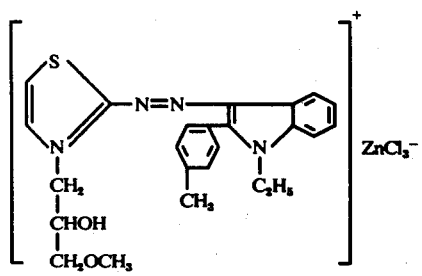 | Red |

What is claimed is:

1. A compound of the formula

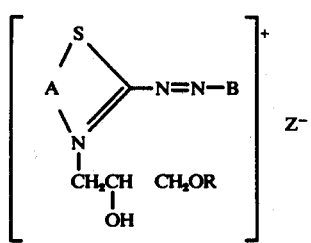

wherein the group

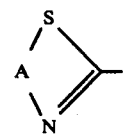

represents a group selected from the class consisting of thiazolyl or thiazolyl substituted at the 4- or 5-positions or both by methyl, ethyl, halogen, cyano or phenyl, and benzothiazolyl or benzothiazolyl substituted at the 6-position by alkyl having 1 to 3 carbon atoms, alkoxy having 1 to 2 carbon atoms, phenoxy, nitro, cyano, thiocyano, halogen, sulfamoyl or alkylsufonyl having 1 to 2 carbon atoms, B represents

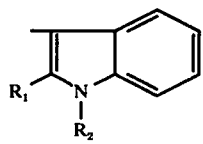

wherein $R_1$ represents alkyl having 1 to 4 carbon atoms, aralkyl having 7 to 8 carbon atoms or phenyl and phenyl substituted by alkyl having 1 to 2 carbon atoms, alkoxy having 1 to 2 carbon atoms, chlorine atom, cyano or nitro, and $R_2$ represents hydrogen, alkyl having 1 to 4 carbon atoms, alkoxyalkyl having 3 to 6 carbon atoms, acetoxyethyl, β-chloroethyl, cyanoalkyl having 2 to 4 carbon atoms or carbamoylalkyl having 3 to 4 carbon atoms, and R represents alkyl having 1 to 4 carbon atoms, and $Z^-$ is an anion.

2. A compound of the formula

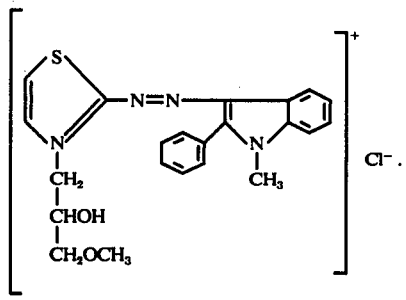

3. A compound of the formula

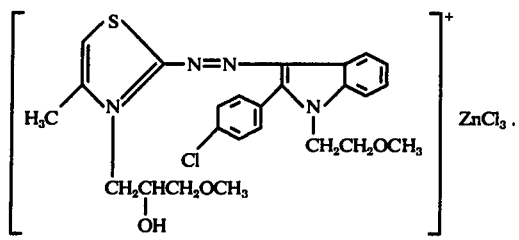

4. A compound of the formula

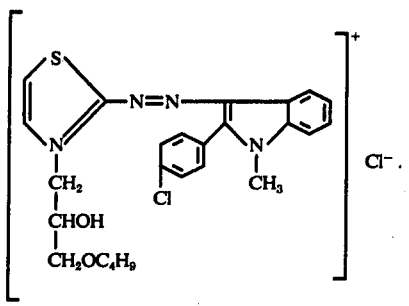

5. A compound of the formula

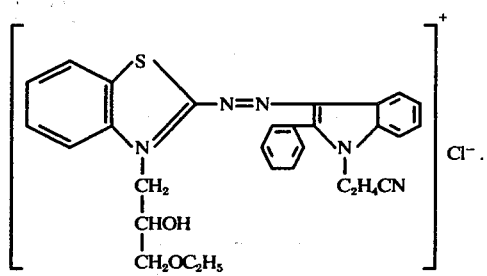

6. A compound of the formula

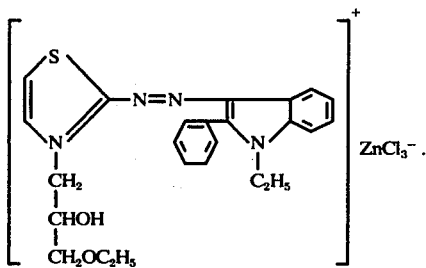

7. A compound of the formula

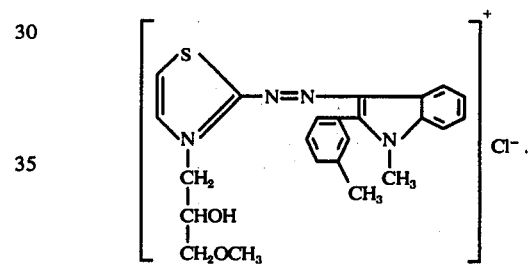

8. A compound of the formula

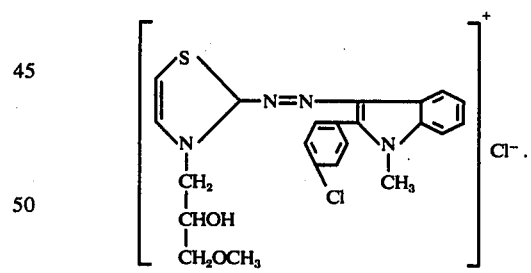

9. A compound of the formula

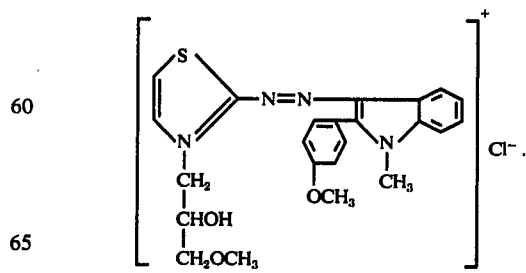

10. A compound of the formula

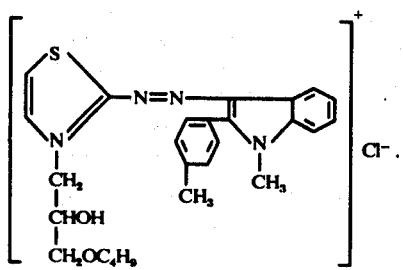
11. A compound of the formula
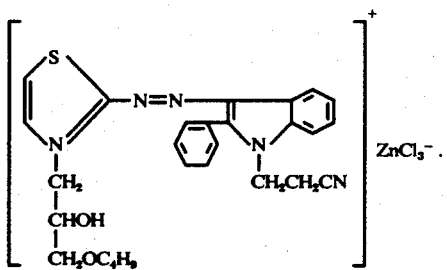
12. A compound of the formula
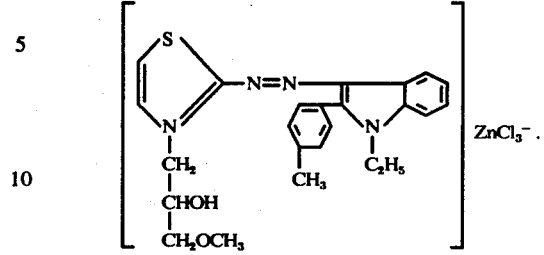
13. A compound of the formula
[H₅C₂O—benzothiazole—N=N—C₆H₄—N(C₂H₅)₂ , N-CH₂CH(OH)CH₂OCH₃]⁺ ZnCl₃⁻.
* * * * *